(12) United States Patent
Hölzel

(10) Patent No.: US 9,227,487 B2
(45) Date of Patent: Jan. 5, 2016

(54) SLIDING HEADLINER FOR A MOTOR VEHICLE

(71) Applicant: WEBASTO SE, Stockdorf (DE)

(72) Inventor: Dominik Hölzel, Olching (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/406,616

(22) PCT Filed: Jul. 23, 2013

(86) PCT No.: PCT/EP2013/065461
§ 371 (c)(1),
(2) Date: Dec. 9, 2014

(87) PCT Pub. No.: WO2014/016270
PCT Pub. Date: Jan. 30, 2014

(65) Prior Publication Data
US 2015/0108794 A1    Apr. 23, 2015

(30) Foreign Application Priority Data

Jul. 23, 2012  (DE) .......................... 10 2012 014 524

(51) Int. Cl.
*B60R 13/02* (2006.01)
*B60J 7/00* (2006.01)

(52) U.S. Cl.
CPC ..................... *B60J 7/0007* (2013.01)

(58) Field of Classification Search
CPC ...... B60J 1/2011; B60J 1/2088; B60J 7/0007; B60J 7/0015
USPC ......................................................... 296/214
See application file for complete search history.

(56) References Cited

U.S. PATENT DOCUMENTS 6,186,587 B1 * 2/2001 Entenmann ................... 296/214
8,690,234 B2   4/2014 Rockelmann et al.

(Continued)

FOREIGN PATENT DOCUMENTS

DE   20 2007 009971 U1   11/2007
DE   10 2009 040766 A1    3/2011
DE   10 2010 018259 A1   10/2011
FR        2959168 A1     10/2011

(Continued)

OTHER PUBLICATIONS

International Search Report dated Sep. 19, 2013, issued in International Application PCT/EP2013/065461.

*Primary Examiner* — Dennis H Pedder
(74) *Attorney, Agent, or Firm* — Fitch, Even, Tabin & Flannery LLP

(57) ABSTRACT

A sliding headliner for a motor vehicle that is movably guided on guides on both sides and that comprises a flexible shading element, whereby the invention provides that the shading element is tightened by two side profile strips of the sliding headliner, which strips are movably guided on the two guides, that each guide has a front guide section and a rear guide section, that the two side profile strips are held at a distance from one another by the rear guide sections under tightening of the shading element in the transverse direction and are guided in a non-tightened manner in the transverse direction by the front guide sections, and that the side profile strips are held at a distance from one another in the transverse direction on the front guide sections by their own bending stiffness and/or by a cross bow.

13 Claims, 3 Drawing Sheets

(56) References Cited

U.S. PATENT DOCUMENTS

2004/0160082 A1* 8/2004 Bohm et al. ............... 296/97.11
2010/0026055 A1 2/2010 Kloock

FOREIGN PATENT DOCUMENTS

GB 2442233 * 4/2008
WO WO2007118455 * 10/2007

* cited by examiner

SLIDING HEADLINER FOR A MOTOR VEHICLE

CROSS REFERENCE TO RELATED APPLICATIONS

This application is a U.S. national phase application filed under 35 U.S.C. §371 of International Application No. PCT/EP2013/065461, filed Jul. 23, 2013, designating the United States, which claims priority from German Patent Application No. 10 2012 014 524.1, filed Jul. 23, 2012, which are all hereby incorporated herein by reference in their entirety for all purposes.

The invention relates to a sliding headliner for a motor vehicle that is movably guided on guides on both sides and that comprises a flexible shading element.

Vehicle roof shadings or sun protection devices are known as movably supported, coated roof lining plates that are relatively expensive to manufacture. Furthermore, windable blinds are known that, however, have the disadvantage of a high construction space requirement on account of the required diameter of a winding shaft.

DE 20 2007 009 971 U1 teaches a movable sun protection for motor vehicles that comprises a flexible shading element that is formed, e.g., from a tissue or a fabric and that is held tightened by a frame that completely surrounds the shading element on all four sides together with a pull bar and that is movably received on its two longitudinal sides in longitudinal guides.

The invention has the problem of creating an initially cited sliding headliner that is simplified as regards its construction.

The problem is solved in accordance with the invention for the initially cited sliding headliner in that the shading element is tightened by two side profile strips of the sliding headliner, which strips are movably guided on the two guides, that each guide has a front guide section and a rear guide section, that the two side profile strips are held at a distance from one another by the rear guide sections under tightening of the shading element in the transverse direction and are guided in a non-tightened manner in the transverse direction by the front guide sections, and that the side profile strips are held at a distance from one another in the transverse direction on the front guide sections by their own bending stiffness and/or by a cross bow.

Advantageous embodiments of the invention are indicated in the dependent claims.

Therefore, in the sliding headliner in accordance with the invention the side profile strips are held at a distance by the two rear guide strips lying opposite one another against the tightening force required for tightening the shading element, whereby the tightening force can have different magnitudes depending on the type and the material of the shading element. In particular, the shading element is not intrinsically or naturally stable and is, e.g., a tissue, a fabric, a net or a sheet. The support of the tightening force takes place in accordance with the particular sliding position of the sliding headliner via the section of the side profile strip received in the rear guide section. A minimum length section of each side profile strip on the back edge or in front of the back edge of the sliding headliner is received in the rear guide section or is supported by the latter in the transverse direction inward or in the Y direction against the tightening force at least in one sliding position of the sliding headliner, preferably in the closing position or covering position of the sliding headliner, that is also designated as the front position.

The designation of the two different guide sections as front and rear guide sections is exemplary and is adapted to the sliding movement of the sliding headliner from a front closed position into a rear open position. In another arrangement of the sliding headliner with e.g., a rear closed position these designations of position and of direction are to be appropriately adapted. The designations of axes and directions such as "front", "rear", "side", "transverse", "top" and "bottom" used in the description basically refer to a three-dimensional x-y-z vehicle coordinate system.

The side profile strips are not supported against one another by the front guide sections in the transverse direction with their particular longitudinal sections, that are arranged as a function of the position of the sliding headliner on the front guide sections, and they are without tightening force support by the front guide sections. Instead, the tightening force support takes place by the side profile strips themselves, that have a certain bending stiffness against a deformation in the transverse direction. The required minimum bending stiffness of the side profile strips is designed as a function of the largest longitudinal section of the side profile strips that is arranged in the front guide sections. As an alternative to the intrinsic support of the side profile strips a transverse cross rail or cross bow can be provided that holds the two side profile strips at a distance from one another in the transverse direction and thus in particular supports against the tightening force. The bending stiffness or bending strength of the side profile strips can then be reduced. The preferred solution combines the support by a cross bow with the shaping of the side profile strips with adapted bending stiffness.

The cross bow makes available a firm connection of the two opposed side profile strips in particular at the level of the front edge of the sliding headliner. Such a cross bow is in particular a pull bar with which the sliding headliner can be adjusted manually or also by a motor and that ensures a synchronous movement of the two side profile strips. On the other hand, an actuating device for adjusting the sliding headliner with the two side profile strips can also be indirectly or directly connected and ensures a synchronous adjusting if a pull bar or a cross bow is not present.

Thus, preferably in the case in which the sliding headliner is arranged in the closed position the side profile strips are held at a distance from one another at least at the level of the rear edge of the sliding headliner by the rear guide sections and when the sliding headliner is open, the support length increases accordingly.

The sliding headliner in accordance with the invention therefore does not require a fixed, in particular frame-like transverse bracing on its rear edge for tightening the shading element in the transverse direction between the guides on both sides and it is therefore preferably constructed with no cross bow in the area of its rear edge.

The sliding headliner of the invention cannot be wound up and therefore is not a blind with a winding shaft. Instead, the moving of the shading element takes place in a flat or slightly curved plane without a strong bending over or folding of the shading element and of the side profile strips.

A sliding headliner is basically a movable shading device that is arranged or can be attached under a transparent roof part or a transparent cover of a roof opening of a vehicle roof that can be opened such as a sliding roof, sliding lifting roof, spoiler roof or the like. The sliding headliner or the shading device can, however, also be provided to cover rear panes or other vehicle surfaces.

Thus, if the sliding headliner is formed on its rear edge located opposite the pull bar without the transverse support part connecting the two side profile strips the manufacture is simplified since no large-area frame has to be built for the shading element. Basically, no other firm transverse connection is provided or required aside from the pull bar or the cross bow. Thus, exclusively the pull bar or a comparable transverse reinforcing part on the sliding headliner forms a rigid connection of the two side profile strips. The cross bow or pull bar can also be guided itself on its side edges in the front guide sections in a sliding manner. The cross bow or pull bar can be guided centrally between the two lateral guides by a centering device or spring device.

The transition from the front guide section to the rear guide section can advantageously be arranged in the closed position of the sliding headliner on the guides shortly in front of the rear edge of the sliding headliner and the sliding headliner or the shading element is held tightened in a rear edge section. The position of the transition can be determined or arranged as a function of the size and/or of the length of the sliding headliner.

The side profile strips can be formed in any shape and cross-sectional form that makes the required bending stiffness available as a function of the necessary tightening force. The side profile strips can basically be manufactured from plastic or of metal. Each side profile strip can be formed in the shape of an L in cross section, whereby the shading element is attached on the longer base shank, that is guided in particular in horizontal alignment. A rather short angled shank extends upward and can be used for lateral guidance.

Each side profile strip is advantageously connected to the cross bow or the pull bar by a plug connection or snap connection. However, even adhesive connections and welded connections can be provided.

The side profile strips can be guided longitudinally on the guides in a linear manner or with a slight curvature but without substantial bendings. The guides customarily run parallel to one another.

A guide track for the side profile strips is advantageously formed on the rear guide section of each guide by an extruded aluminum profile. Such a profile can be formed in a simple manner with undercuts so that support webs or support cheeks or -surfaces can be formed for supporting the side profile strip guided in them in the transverse direction or the Y direction.

A guide track for the side profile strips on the front guide section can preferably be formed by at least one plastic profile and in particular be formed as a U-shaped groove. With it the sliding headliner in accordance with the invention can be arranged in particular on a frame arrangement of a sliding roof, sliding lifting roof or the like, in which arrangement a metallic rail is required only in the rear section for the support and guidance of a movable cover of this roof for reasons of firmness and of industrial manufacturing, in contrast to which in the front section plastic guides for the support of the cover are preferred and sufficient.

The invention is explained in detail in the following using an exemplary embodiment of a sliding headliner in accordance with the invention with reference made to the drawings. In the drawings.

Figure 1:
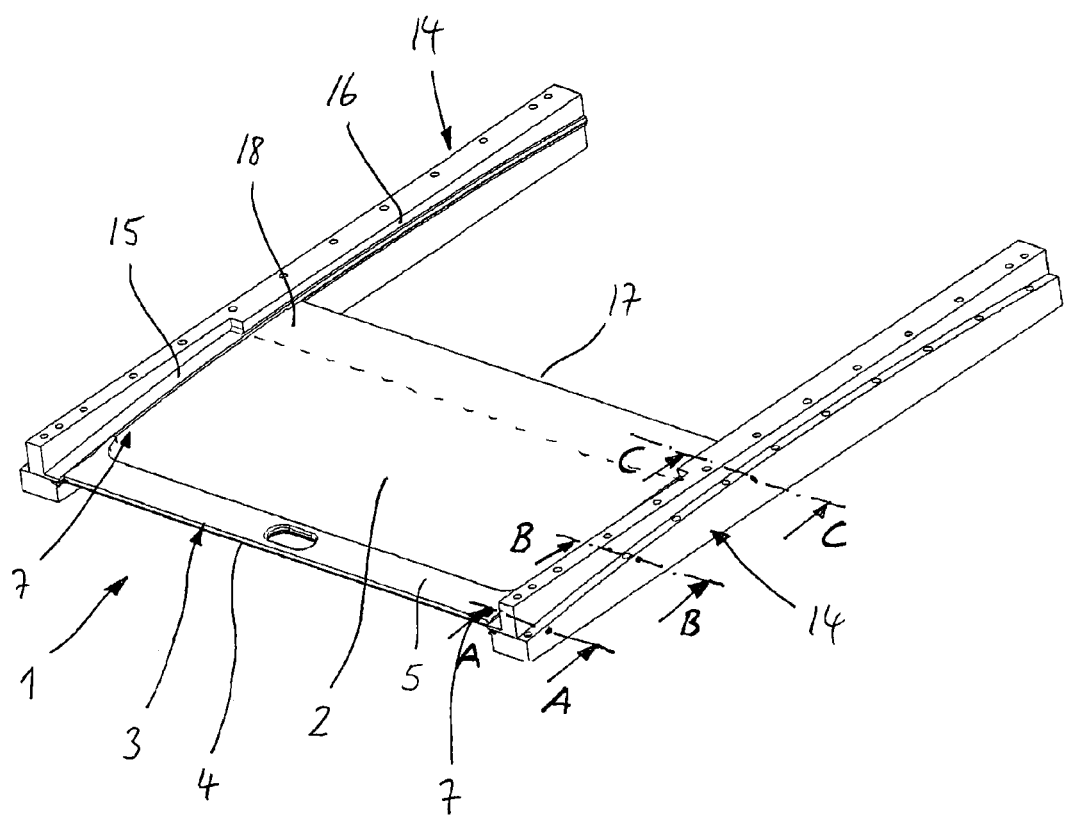
FIG. 1 shows an isometric view of a sliding headliner supported on lateral guides in a front sliding position.

A sliding headliner 1 of a motor vehicle (see FIG. 1) contains a planar shading element 2 formed, e.g., from a tissue, a net, a fabric or a sheet or the like and that is not intrinsically stabile or inherently stabile and accordingly is not a rigid plate or the like. A cross bow or pull bar 3 forms a front edge 4 of the sliding headliner 1. The pull bar 3 has an upper part 5 and a lower part 6 that are connected to one another and between which the shading element 2 is inserted with its front section and clamped fast.

Figure 2:
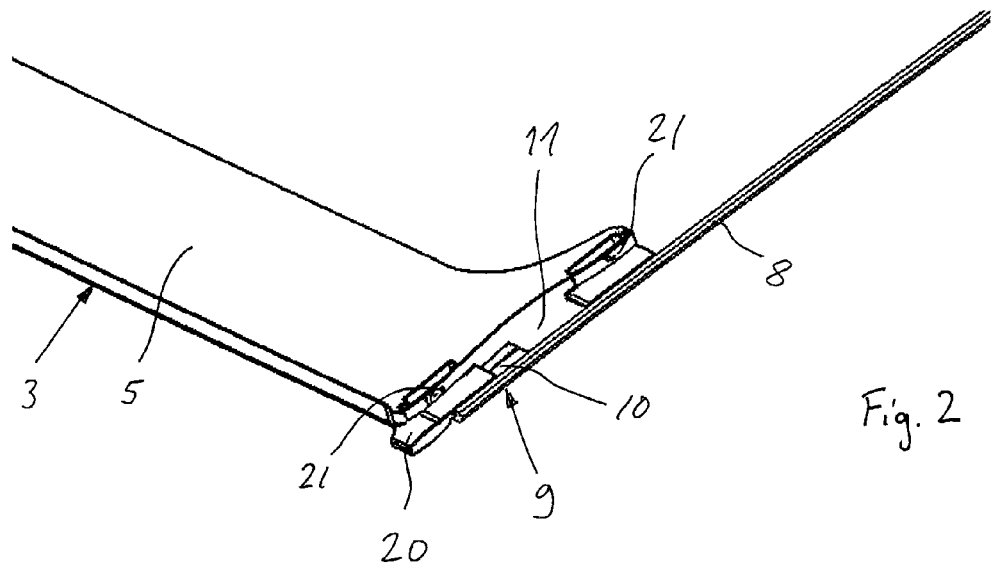
FIG. 2 shows an isometric view of the top of a section of the front left corner area of the sliding headliner with a pull bar and a left side profile strip.
Figure 3:
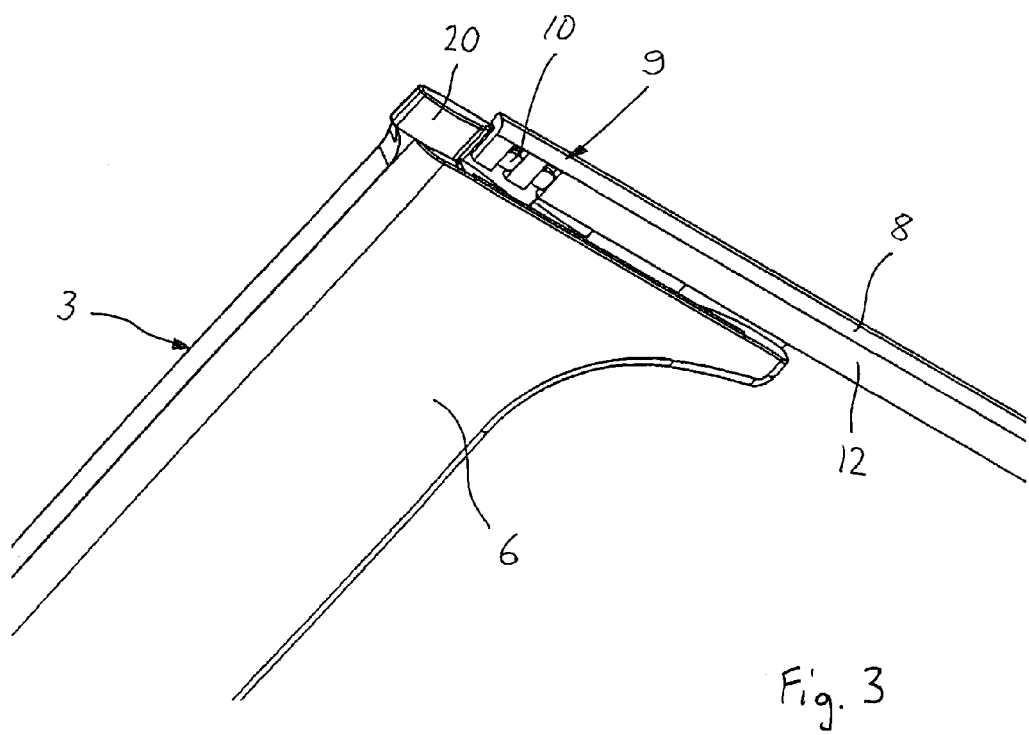
FIG. 3 shows an isometric view of the bottom of the section of FIG. 2.

A side profile strip 8 is arranged on each longitudinal side 7 of the sliding headliner 1 (see FIGS. 2 and 3) that is fastened on its front section 9 in particular by a plug connection or snap connection 10 on the side edge 11 of the pull bar 3, that forms a front transverse support part of the sliding headliner 1. The two opposing side profile strips 8 extend over the length of the sliding headliner 1. Each side profile strip 8 is resistant to bending in the transverse direction of the sliding headliner 1 and is, for example, L-shaped in its cross section with a longer base shank 12 in the cross-sectional plane and with a shorter angled shank 13 projecting upward from the latter at a right angle or in the Z direction as a result of whose shape the desired bending stiffness in the transverse direction or Y direction is achieved. The shading element 2 is fastened at the top of the base shank 12 on the side of the edge, e.g., by adhesion, welding or sewing.

Each side profile strip 8 is taken up in a lateral guide 14 and movably guided in the longitudinal direction. The two guides 14 running parallel to each other each have a front guide section 15 and a following rear guide section 16. FIG. 1 shows the sliding headliner 1 in its closed position in which it assumes a front position relative to the two guides 14 and—when arranged under a vehicle roof—for example under a glass cover of a vehicle roof capable of being opened (not shown). The front guide section 15 does not extend when the sliding headliner 1 is arranged in the closed position over the entire length of the sliding headliner 1 but ends in front of the rear edge 17 of the sliding headliner 1 or of the shading element 2. The following, rear guide section 16 thus extends initially along a rear edge section 18 of the sliding headliner 1 (represented in FIG. 1 between the rear edge 17 and the interrupted line sketched in in front of it) and further to the rear in a length provided for a maximal shifting path or opening path of the sliding headliner 1.

Figure 4:
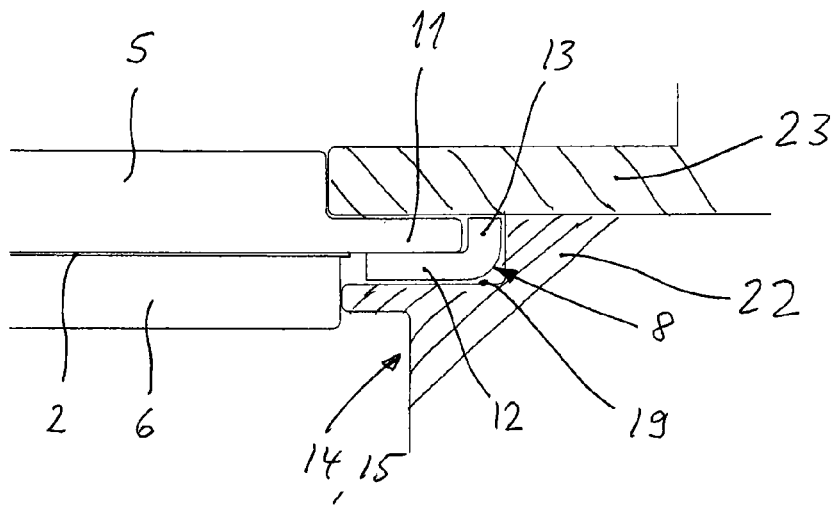
FIG. 4 shows a cross-sectional view along line A-A in FIG. 1 of the pull bar with the side profile strip received in the side guide.
Figure 5:
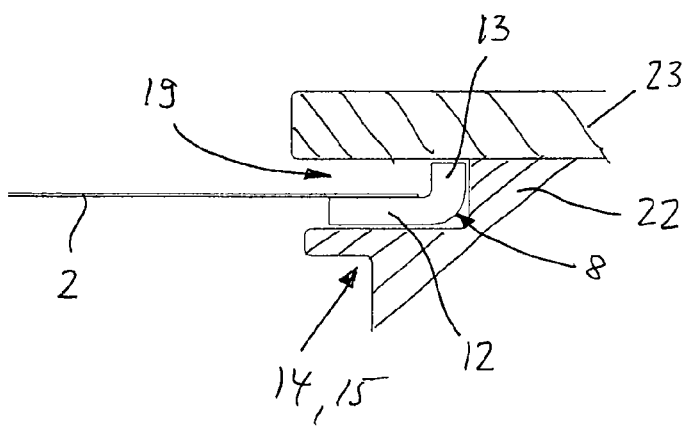
FIG. 5 shows a cross-sectional view along line B-B in FIG. 1 of the side profile strip in the side guide.

Each guide 14 has a guide track 19 in the front guide section 15 (see FIGS. 4 and 5) which track is formed as a grooved channel with a rectangular cross section and is open to the sliding headliner 1. The side profile strip 8 is movably received in the guide track 19, whereby the height of the side profile strip 8 on its angled shank 13 is adapted to the height of the guide track 19 in such a manner that it is guided substantially without play in a vertical direction. The pull bar 3 is also received in the guide track 19 with its side edge 11 and guided in it with a front slider 20. Two spring elements 21 of a spring device (see FIG. 2) are arranged in the area of each side edge 11 of the pull bar 3 which elements are supported on the opposing guides 14 and hold the pull bar 3 centered between the two guides 14. The guide 14 has in the area of the front guide section 15 e.g. a lower guide structural part 22 and an upper guide structural part 23 that are connected to one another and form the guide path 19 between themselves. The two guide structural parts 22 and 23 are formed, e.g., from plastic and are in particular parts of a frame arrangement of a sliding roof unit supporting the sliding headliner 1 on a lower side of the vehicle roof.

Figure 6:
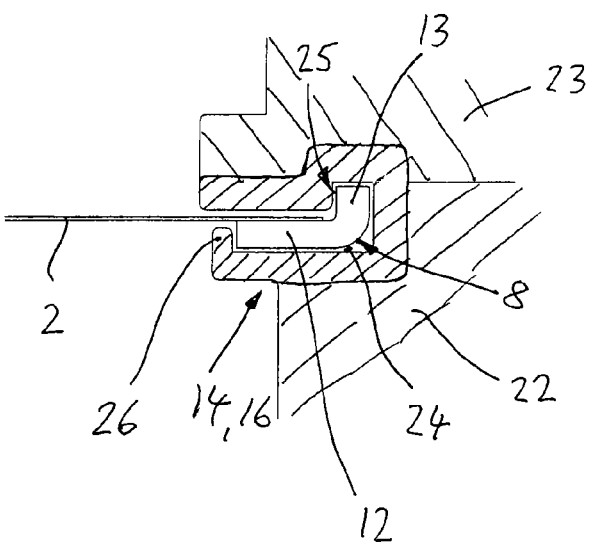
FIG. 6 shows a cross-sectional view along line C-C in FIG. 1 of the side profile strip in an undercut of the side guide.

The guide 14 comprises a guide track 24 in the rear guide section 16 (see FIG. 6) which guide track is formed in particular in one piece from an extruded aluminum profile. The guide track 24 is adapted in cross section to the side profile strip 8 in such a manner that it prevents the side profile strip 8 from being pulled out in the transverse direction or Y direction (i.e., to the left in FIG. 6). To this end it comprises, e.g., a groove-shaped wrap-around 25 for the angled shank 13 and/or a web 26 as stop for the base shank 12. The two side profile strips 8 of the sliding headliner 1 are positioned by the guide tracks 24 in the particular rear guide section 26 at such a distance from one another that they hold the shading element 2 in a tightened manner. The guide track 24 or the extruded aluminum profile is attached at at least one structural guide part such as the lower structural guide part 22 or is held by the two structural guide parts 22 and 23. On the other hand the guide track 24 itself can also be formed by at least two structural guide parts comparable to the two structural guide parts 22 and 23. In any case, the front guide track 19 merges continuously into the rear guide track 24, whereby according to the exemplary embodiment the side edge 11 of the pull bar 3 can move only in the front guide section 15 since the extruded aluminum profile prevents a further movement in the cross-sectional form shown.

Therefore, in the front sliding position or closing position of the sliding headliner 1 (FIG. 1) the pull bar 3 holds the two side profile strips 8 in the two front guide tracks 19 in the provided distance for tightening the shading element 2 in the transverse direction or the Y direction on the front edge of the sliding headliner 1. On the rear edge section 18 the two side profile strips 8 are held at a distance on the particular rear guide section 16 by the rear guide tracks 24 so that a rear transverse support of the two side profile strips 8 such as, e.g., a rear frame part is not required. The two side profile strips 8 tighten the shading element 2 between themselves between the pull bar 3 and the rear edge section 18, since they are not drawn against one another or deformed by the tightening force of the tightened shading element 2 on account of their bending stiffness—even without being guided inward in the transverse direction as in the rear guide section 16.

During the shifting of the sliding headliner 1 along the guides 14 in the direction of its rear open position the side profile strips 8 slide as the length increases into the rear guide tracks 24 on the particular rear guide section 16, whereby the rear edge section 18 widens with the lateral distance guiding into the side profile strips 8 until the sliding headliner 1 is supported substantially completely on the rear guide section 16.

The shown cross-sectional profile of the side profile strip 8 is exemplary. The cross-sectional profile can also be designed to be different from the above as long as it meets the described functionality. The guides 14 can have a slightly curved track course in the longitudinal direction (see FIG. 1). If this track course has a radius of curvature that does not change, the side profile strips 8 can be manufactured with this curvature and a high deformation stiffness. In the case of a radius of curvature that changes over the track course, the side profile strips 8 have a bending stiffness that allows a deformation and adaptation to the track course of the guiding that changes in its curvature.

The individual features of the invention disclosed in the description and using the exemplary embodiment and in the figures can be combined in any technologically purposeful arrangements and shapes with the subject matter of the invention in its general form.

The invention claimed is:

1. A sliding headliner for a motor vehicle that is movably guided on guides on both sides, comprising:
   a flexible shading element, wherein the shading element is tightened by two side profile strips of the sliding headliner,
   which strips are movably guided on two guides, that each guide has a front guide section and a rear guide section, that the two side profile strips are held at a distance from one another by the rear guide sections under tightening of the shading element in a transverse direction and are guided without tightening in the transverse direction by the front guide sections, and
   that the side profile strips are held at a distance from one another in the transverse direction on the front guide sections by their own bending stiffness.

2. The sliding headliner according to claim 1, wherein the side profile strips are held at a distance from one another in the transverse direction on the front guide sections in addition by a cross bow.

3. The sliding headliner according to claim 1, wherein when the sliding headliner is arranged in a closed position the side profile strips are held at a distance from one another at least at a level of the rear edge of the sliding headliner by the rear guide sections.

4. The sliding headliner according to claim 1, wherein the sliding headliner is constructed free of cross bows in an area of its rear edge.

5. The sliding headliner according to claim 1, wherein the shading element is not inherently stable and is formed from a material selected from the group consisting of a tissue, a fabric, a net and a sheet.

6. The sliding headliner according to claim 1, wherein the rear guide section comprises a guide track for the side profile strip that is formed by an extruded aluminium profile and comprises an undercut for supporting the side profile strip with tightening force in the transverse direction.

7. The sliding headliner according to claim 1, wherein a guide track for the side profile strips on the front guide section is formed by at least one plastic profile and is formed as a U-shaped groove.

8. The sliding headliner according to claim 7, wherein the side profile strips are guided longitudinally on the guides and/or on the guide tracks in a linear manner.

9. The sliding headliner according to claim 2, wherein each side profile strip is connected by a plug connection to the cross bow.

10. The sliding headliner according to claim 2, wherein the cross bow or a pull bar forms the front edge of the sliding headliner.

11. The sliding headliner according to claim 1, wherein each side profile strip is constructed to be L-shaped in its cross section and that the shading element is attached to the longer base shank.

12. The sliding headliner according to claim 1, wherein the side profile strips are guided longitudinally on the guides and/or on the guide tracks with a slight curvature.

13. The sliding headliner according to claim 2, wherein each side profile strip is connected by a snap connection to the cross bow.

* * * * *